United States Patent [19]

Kemp

[11] Patent Number: 4,682,664
[45] Date of Patent: Jul. 28, 1987

[54] LOAD SENSING SYSTEMS FOR CONVEYOR WEIGH SCALES

[75] Inventor: Charles W. Kemp, Arlington, Tex.

[73] Assignee: Canadian Corporate Management Co., Ltd., Toronto, Canada

[21] Appl. No.: 761,173

[22] Filed: Jul. 31, 1985

[51] Int. Cl.[4] .................. G01G 11/14; G01G 3/08; G01L 25/00

[52] U.S. Cl. .................. 177/16; 177/229; 73/1 B

[58] Field of Search .............. 177/16, 211, 229; 73/1 B

[56] References Cited

U.S. PATENT DOCUMENTS

| | | | |
|---|---|---|---|
| 3,439,761 | 4/1969 | Laimins | 177/16 X |
| 3,650,340 | 3/1972 | Bradley | |
| 4,128,001 | 12/1978 | Marks | 177/229 X |
| 4,157,661 | 6/1979 | Schindel | |
| 4,380,175 | 4/1983 | Griffen | 177/211 X |
| 4,463,816 | 8/1984 | MacFarlane | 177/119 |
| 4,541,496 | 9/1985 | Layer | 177/211 |

FOREIGN PATENT DOCUMENTS 1104371  7/1981  Canada

OTHER PUBLICATIONS

Weighing and Proportioning of Bulk Solids, Chapter 7—"Belt Scales", H. Colisn; Trans Tech Publications, 1975.

Primary Examiner—George H. Miller, Jr.
Attorney, Agent, or Firm—Pahl, Lorusso & Loud

[57] ABSTRACT

A weighbridge unit for use in a conveyor weigh scale has a support for part of the conveyor belt, such as a trough or one or more idlers, a bridge carrying the support, and load cells formed by cantilever strain gauge bridge units supporting the ends of the bridge, the electrical outputs of the bridge units being summed to provide a weighbridge output signal. Cantilever arms of the load cell bridge units preferably extend in the direction of movement of the belt.

12 Claims, 5 Drawing Figures

LOAD SENSING SYSTEMS FOR CONVEYOR WEIGH SCALES

FIELD OF THE INVENTION

This invention relates to conveyor belt scales, used for the weighing of material transported on conveyor belts.

BACKGROUND OF THE INVENTION

The state of the art in such scales is comprehensively discussed in Chapter 7, entitled "Belt Scales", of "Weighing and Proportioning of Bulk Solids" by Hendrik Colijn and published by Trans Tech Publications in 1975. The content of this chapter is incorporated herein by reference. It will be apparent from a study thereof that the design of weighbridge systems for conveyors is associated with a number of problems.

The assignee of the present applicant is the proprietor of U.S. Pat. No. 4,157,661, issued June 12, 1979 to Milton R. Schindel, in respect of flowmeters of the inclined plate type, in which the inclined plate is supported by a load cell of the cantilever strain gauge bridge type. In improvements of this gauge disclosed in the same assignee's Canadian Pat. No. 1,104,371, improved forms of cantilever strain gauge bridge are employed. An earlier patent disclosing the use of cantilever strain gauge bridge units for measuring axle and drawbar loadings in vehicles is disclosed in U.S. Pat. No. 3,650,340 issued Mar. 21, 1972 to Bradley. In the flowmeter discussed above, a particular advantage of the use of cantilever strain gauge bridge units is the avoidance of the necessity for taking mechanical connections through the wall of the duct in which flow is being measured, whilst in the applications envisaged by Bradley, the insensitivity of the device to the lateral displacement of the load vector from the position of the wheel or drawbar is a great advantage.

SUMMARY OF THE INVENTION

Surprisingly, I have now found that the application of load cells in the form of cantilever load cell bridge units to conveyor weighbridge systems brings very substantial advantages despite the fact that the problems with known weighbridge systems have been appreciated for many years and the fact that cantilever load cell bridge units have long been commercially available. In particular, it is possible to provide a very compact weighbridge system which eliminates all knife edges and pivots, which provides excellent rejection of non-vertical force components acting on the bridge, which need deflect only to a very small degree under load, and which can be exceptionally easily installed and calibrated.

According to the invention, a conveyor belt weighbridge unit comprises support means for a section of a conveyor belt run, a frame, and at least one cantilever strain gauge bridge unit responsive to vertical components of the forces applied thereto by the support means, said at least one unit providing the sole support for said support means on said frame.

It is a characteristic of cantilever load cell bridges that they sense deflections of the cantilever arm relative to its anchorage in a single dimension and are insensitive and resistant to force components perpendicular to that dimension. A form of cantilever strain gauge bridge unit preferred for use in the present invention has a vertically extending support for a cantilever arm, the cantilever arm comprising a vertically extending carrier for the load to be measured, the carrier being horizontally displaced from the support, and two vertically spaced cantilever beams connecting the carrier to the support, each having two horizontally spaced strain gauge elements bonded to surfaces of the beams extending in a horizontal plane, the strain gauge elements being connected into an electrical bridge such that their outputs responsive to vertical force components applied to the carrier are additive. Preferably the support means extend transversely to the belt run, and two strain gauge bridge units are provided at opposite ends of the support means with their cantilever arms extending in the direction of movement of the belt run.

SHORT DESCRIPTION OF THE DRAWINGS

DESCRIPTION OF THE PREFERRED EMBODIMENTS

Figure 1:
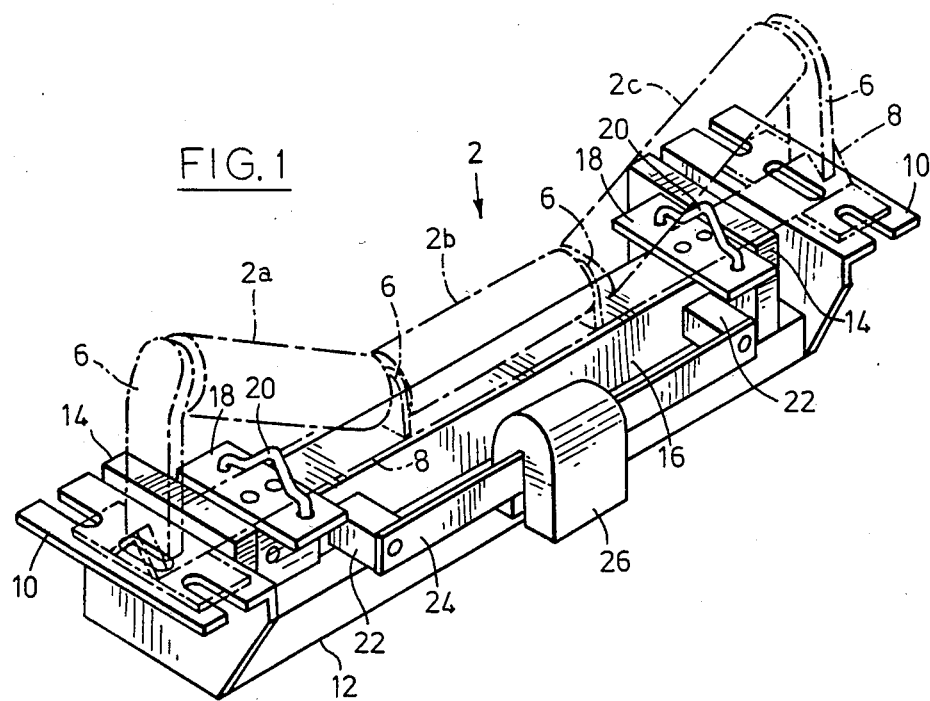
FIG. 1 is a perspective view illustrating a first embodiment of weighbridge unit according to the invention.
Figure 3:
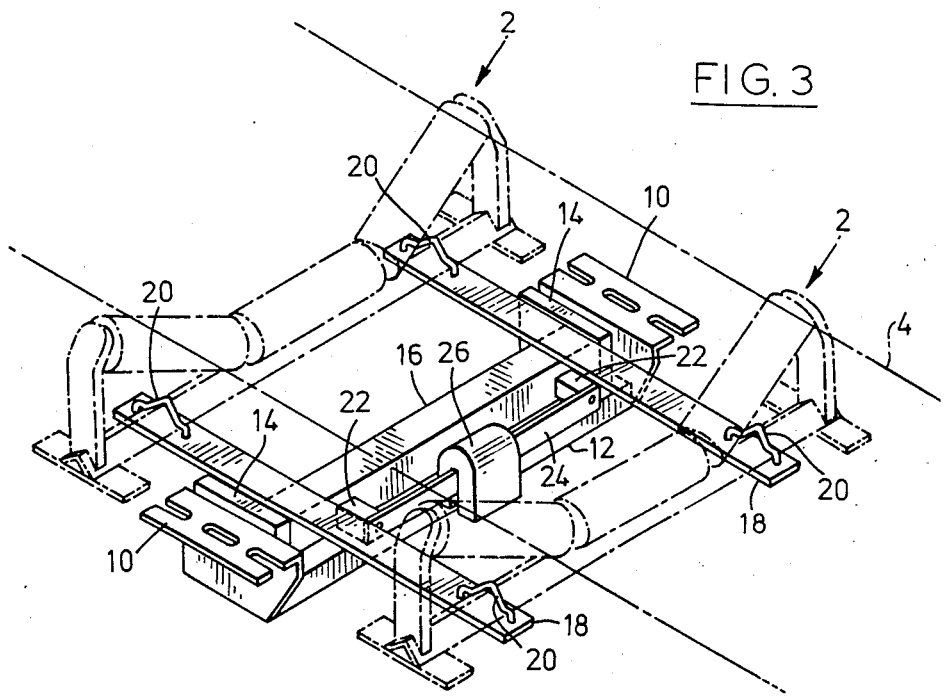
FIGS. 3 and 4 illustrate modifications of the weighbridge of FIG. 1.

Referring first to FIG. 1, the weighbridge of this embodiment is designed as a drop-in unit supporting an idler 2 (shown in broken lines) carrying a section of the upper run of a conveyor belt 4 (not shown in this Figure, but see FIG. 3). The idler 2 comprises three idler rollers 2a, 2b and 2c supported by brackets 6 on a cross-bar 8, and may be of entirely conventional construction except that the height of the brackets should be such that the idler rolls are properly aligned with those of adjacent idlers when the cross-bar is mounted with a clearance over brackets 10 by which the weighbridge is supported in the conveyor structure.

The brackets 10 support the ends of a first cross beam 12, forming a frame which in turn supports two load cells 14, described further below. The load cells 14 in turn support a second cross beam 16 which itself carries mounting plates 18 to which the cross-bar 8 is releasably secured by U-bolts 20. Brackets 22 on the beam 16 support a rail 24 extending parallel to the beam. A removable slidable calibration weight 26 rides on the rail 24 for a purpose described further below.

Figure 2:
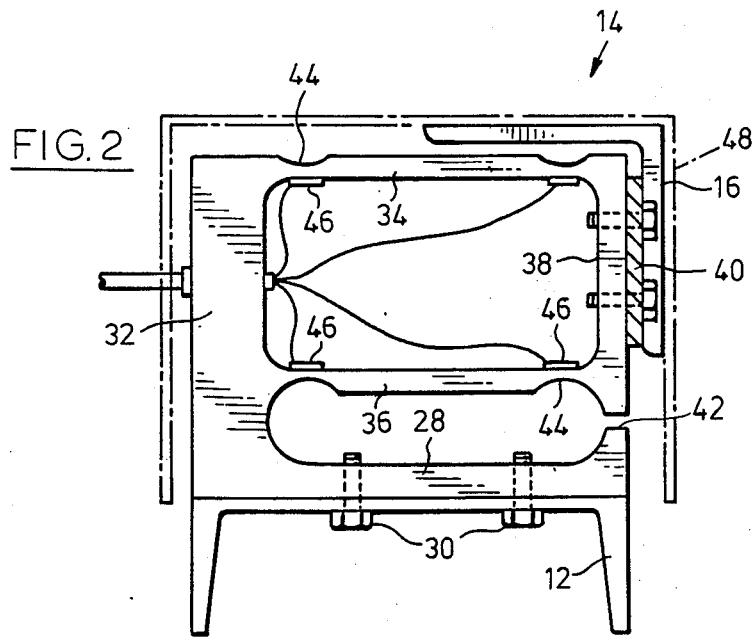
FIG. 2 is an enlarged cross sectional detail of a load cell incorporated in the weighbridge of FIG. 1.

One of the load cells 14 is shown in greater detail in FIG. 2. It comprises a strain gauge bridge unit, the body of which is machined from a single steel block so as to provide a foot 28 which is rigidly secured by bolts 30 to the cross beam 12, a rigid vertical column 32, and a cantilever arm formed by parallel top and bottom beams 34 and 36 and an outer vertical connecting support 38 to which is bolted a bracket 40, supporting one end of the beam 16. The lower end of the support 38 and a toe portion 42 of the foot 28 are shaped so as to limit downward deflection of the cantilever arm and thus prevent flexure of beams 34 and 36 beyond their elastic limit. Recesses 44 are machined into the beams 34 and 36 to reduce their vertical extent adjacent their ends, and strain gauge elements 46 are bonded to horizontal surfaces of the beams 34 and 36 opposite the recesses 44. A shroud 48 protects the bridge unit from dirt. The parallelogram frame structure provided by the column, beams and support has a resistance to deflection in response to vertical loads applied through the beam 16 which, although sufficiently large as to prevent more than very slight downward deflection of the beam under normal working loads, is very small compared to its resistance to deflection in other dimensions.

Furthermore, the location, character and connection of the strain gauge elements is such that they are individually much more responsive to deflections caused by vertical loadings, and the interconnection of the cells is such as to provide mutual cancellation of responses caused by other than vertical forces. Such strain guage bridges are in themselves known, being utilized for example in certain of the embodiments of flowmeter disclosed in the abovementioned Canadian Pat. No. 1,104,371.

Rather than the parallelogram structure of the cantilever arm shown in FIG. 2, a simple bar may be utilized with the load cells applied to its upper and lower surfaces, as disclosed in U.S. Pat. No. 3,650,340, but it is believed that the parallelogram frame arrangement provides a more compact structure, greater sensitivity, better exclusion of unwanted responses, and, of special significance in the present application, a geometry that minimizes tilting of the weighbridge as the cantilever arm deflects. It will be appreciated that the parallelogram frame responds to deflection in a manner approaching that of a parallelogram linkage, such that the support 38 and thus the beam 16 move parallel to the column 32. As seen in FIG. 2, a vertical load applied through the beam 12 will cause the top left-hand and bottom right-hand elements 46 to be compressively strained, and the top right-hand and bottom left-hand elements 46 to be strained in tension, providing an output of opposite polarity, the bridge being connected so that the opposed polarity outputs of the cells are combined additively as discussed further below with reference to FIG. 5. Since the cells, to the extent that they respond to strains caused by other than vertical forces applied through the beam 16, will tend all to respond similarly and provide various responses of the same polarity, the summing of these responses as set forth above tends to result in cancellation.

If a single bar is used, deflection is accommodated by bending of the beam, and the beam 16 will tilt as deflection occurs, unless supported by multiple bars to provide the functional equivalent of the parallelogram arrangement described above. A different connection of the strain gauge elements is required, since both upper cells will be in tension, and both lower cells in compression.

In the arrangement shown, the beam 16 is supported by two load cells located at opposite ends of the beam, with the cantilever arms extending in the direction of movement of the belt supported by the weighbridge. This arrangement is presently believed best for most applications. Any lateral forces applied through the beam 16 will be well resisted, and the trailing direction of the arms help minimize unwanted vertical and longitudinal oscillation of the assembly. The use of two load cells stabilizes the weighbridge against lateral rocking forces, and facilitates calibration as discussed further below. Nevertheless, a single central load cell may provide adequate performance in some light duty applications, and more than two load cells could be utilized if necessary or desirable. In every case, the transfer of forces between the support means for the portion of the belt being weighed and the frame of the weighbridge unit must be solely through the load cells, and the load cells must be of the cantilever strain gauge bridge type if the advantages of the invention are to be obtained.

The portion of the weighbridge actually supporting the conveyor may take different forms according to the application. It may be desired to support a greater length of belt on the weighbridge, and in this case the arrangement shown in FIG. 3 may be utilized, in which the mounting plates 18 are extended upstream and downstream of the beam 16, supporting separate idlers 2 symmetrically located upstream and downstream of the beam. In the arrangement shown in FIG. 4, the idler 2 is replaced by a trough 50 which slidingly supports a portion of the belt. The small vertical deflections required to operate the load cells 14 and their parallel action and rejection of spurious outputs due to non-vertical force components are found particularly valuable in this application, in which it is important that the trough maintains accurate alignment with the belt.

In some conveyor installations upgrading of an existing weighbridge may be achieved by mounting a weighbridge unit in accordance with the invention above the conveyor run and an existing single load cell weighbridge, and replacing the load cell in the existing weighbridge by drop links transferring the forces which would have been applied to that load cell to the support means of the new weighbridge unit. This is less satisfactory than the preferred embodiments, since any frictional losses or production of spurious vertical force components in the existing weighbridge mechanism will influence the weighbridge output despite improved vertical resolution in the new unit.

Figure 5:
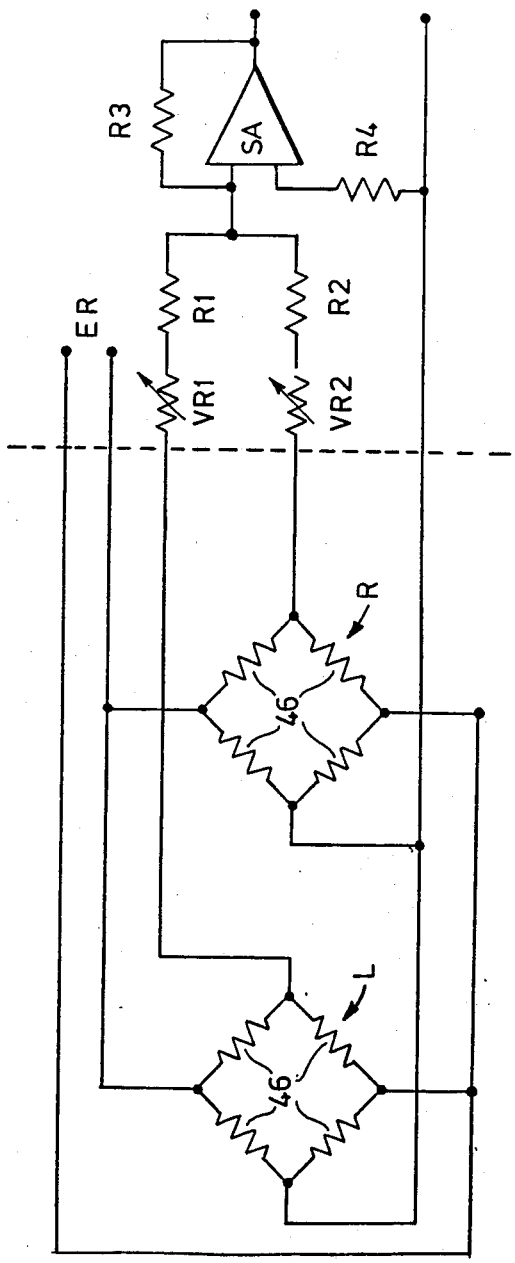
FIG. 5 is a schematic diagram of the electric circuit of the weighbridge of FIGS. 1, 3 and 4.

Each of the embodiments described may utilize the same electrical circuitry, schematically shown in FIG. 5. The strain gauge elements 46 of each bridge 14 are connected in conventional electrical bridge configurations L & R (representing left and right hand bridges 14 respectively) and an excitation potential ER is applied to the bridge input connections. Any imbalance in the bridges shows up as potentials across their output connections, one of which at each bridge is grounded and the others of which are applied to a summing amplifier SA through fixed and variable resistors R1, R2, VR1 and VR2. In order to calibrate the weighbridge, the calibration weight 26 is placed at various positions on the rail 24, and successive adjustments are made to the variable resistors VR1 and VR2, both so as to maintain the output of the amplifier constant regardless of the lateral position of the weight (thus equalizing the response characteristics of the two bridges L & R) and so as to obtain a given change in output when the weight is removed from the rail. This latter adjustment may more conveniently be made by adjusting the gain of an amplifier in a measuring unit to which the output of the amplifier SA is applied. Such a unit may be of any conventional type designed for handling load cell outputs from conveyor belt scale weighbridges, an example being the unit sold under the trade mark COMPUS-CALE by the assignee of the present application. Such a unit filters and integrates the weighbridge output, and provides zeroing adjustments and other features, which need not be described since such a unit forms no part of the invention.

Figure 4:
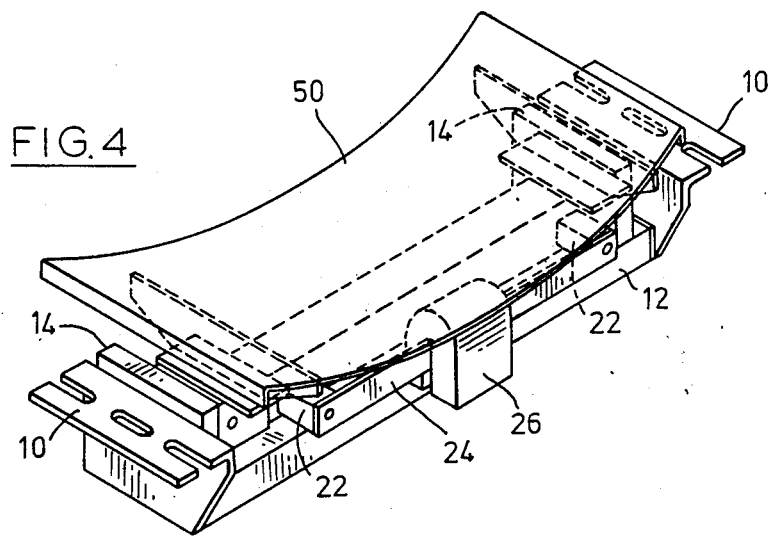

As will be appreciated from FIGS. 1, 3 and 4, installation of the weighbridge of the invention is extremely simple. Since the strain gauge bridge units not only resolve the vertical load of the belt, but also locate in three dimensions the support means for the portion of the belt being monitored, installation is simply a matter of bolting the unit in place on the conveyor frame with the idlers 2 or trough 50 in proper alignment with the belt. This is in contrast to conventional weighbridge systems which need careful installation of whatever means is used to transfer the weighbridge load to the load cell or cells used for measurement, and more particularly of whatever systems are utilized to locate the weighbridge against non-vertical forces in order that these forces do not influence the output of the system. The bulk suspension required by conventional weighbridges is eliminated, together with all moving parts other than the idler rollers themselves.

In use, the belt 4 runs over belt support means comprising the weighbridge idler or idlers 2 or the trough 50, carrying the commodity to be weighed. All forces applied by the belt to the idler are transmitted to the conveyor frame through the load cells 14 which locate the support means in the frame. The cells 14 resolve these forces, so that the bridge outputs reflect only their total vertical components, the circuit of FIG. 5 presenting an output potential proportional to these components. This output potential can then be subjected to any offset necessary for zeroing, filtered and integrated if required to provide data as to the rate or amount of material passing over the weighbridge unit.

I claim:

1. A conveyor belt weighbridge comprising support means for supporting a section of a conveyor belt run, said support means extending transversely of a line of travel of said run, a frame member extending transversely relative to the conveyor belt run for supporting the weighbridge in a fixed relationship to said line of travel, and transversely spaced cantilever strain gauge bridge units between the frame member and opposite ends of the support means, said units being responsive to vertical components of forces applied thereto by the support means, said units providing the sole support for said support means, the support means being supported by the units vertically above the frame member.

2. A conveyor belt weighbridge comprising support means for supporting a section of a conveyor belt run, said support means extending transversely of a line of travel of said run, a frame member extending transversely relative to the conveyor belt run for supporting the weighbridge in a fixed relationship to said line of travel, and transversely spaced cantilever strain gauge bridge units between the frame member and the support means, said units being responsive to vertical components of forces applied thereto by the supports means, said units providing the sole support for said support means on said frame member, the support means being supported by the units vertically above the frame member each of said strain gauge bridge units having a support pillar for a cantilever arm extending vertically from the frame, the cantilever arm comprising a carrier pillar for the load to be measured extending vertically from the support means, the carrier pillar being horizontally displaced from the support pillar, and two vertically spaced cantilever beams connecting the carrier pillar to the support pillar, each having two horizontally spaced strain gauge elements bonded to surfaces of the beams extending in a horizontal plane, the strain gauge elements being connected into an electrical bridge such that their outputs responsive to vertical force components applied to the carrier pillar are additive, and the connections between the support pillar and the frame and between the carrier pillar and the support means being located so that the cantilever beams are cantilevered respectively above the frame and beneath the support means.

3. A conveyor weighbridge according to claim 2, wherein said support means is supported by strain gauge bridge units at opposite ends.

4. A conveyor weighbridge according to claim 3, wherein said strain gauge bridge units have cantilever arms extending in the direction of movement of the conveyor belt run.

5. A conveyor weighbridge according to claim 4, wherein each strain gauge bridge unit has a support pillar for a cantilever arm extending vertically from the frame, the cantilever arm comprising a carrier pillar for the load to be measured extending vertically from the support means, the carrier pillar being horizontally displaced from the support pillar, and two vertically spaced cantilever beams connecting the carrier pillar to the support pillar, each having two horizontally spaced strain gauge elements bonded to surfaces of the beams extending in a horizontal plane, the strain gauge elements being connected into an electrical bridge such that their outputs responsive to vertical force components applied to the carrier pillar are additive, and the connections between the support pillar and the frame and between the carrier pillar and the support means being located so that the cantilever beams are cantilivered respectively above the frame and beneath the support means.

6. A conveyor weighbridge according to claim 5, wherein the support means is an idler.

7. A conveyor weighbridge according to claim 5, wherein the support means comprises a belt supporting trough.

8. A conveyor weighbridge according to claim 3, wherein each strain gauge bridge unit has a support pillar for a cantilever arm extending vertically from the frame, the cantilever arm comprising a carrier pillar for the load to be measured extending vertically from the support means, the carrier pillar being horizontally displaced from the support pillar, and two vertically spaced cantilever beams connecting the carrier pillar to the support pillar, each having two horizontally spaced strain gauge elements bonded to surfaces of the beams extending in a horizontal plane, the strain gauge elements being connected into an electrical bridge such that their outputs responsive to vertical force components applied to the carrier pillar are additive, and the connections between the support pillar and the frame and between the carrier pillar and the support means being located so that the cantilever beams are cantilevered respectively above the frame and beneath the support means.

9. A conveyor weighbridge according to claim 8, further comprising potentiometer means receiving the outputs of the electrical bridge and adjustable to equalize the incremental weight responses thereof, and summing means receiving and adding the outputs of the potentiometer means.

10. A conveyor weighbridge according to claim 9, wherein the support means is provided with means to support a removable calibration weight at different locations laterally of the weighbridge.

11. A conveyor belt weighbridge unit comprising:

support means for supporting a section of a conveyor belt run, said support means extending transversely of a line of travel of said run;

a frame;

at least one cantilever strain gauge bridge unit responsive to vertical components of the forces applied thereto by said support means, said support means being supported by strain gauge bridge units at opposite ends of said support means with said strain gauge bridge units providing the sole support for said support means on said frame, each of said strain gauge bridge units having a vertically extending support for a cantilever arm, the cantilever arm comprising a vertically extending carrier for the load to be measured, the carrier being horizontally displaced from the vertically extending support, and two vertically spaced cantilever beams connecting the carrier to the support, each having two horizontally spaced strain gage elements bonded to surfaces of the beams extending in a horizontal plane, the strain gauge elements being connected into an electrical bridge such that their outputs responsive to vertical force components applied to the carrier are additive, said support means also being provided with means to support a removable calibration weight at different locations laterally of the weighbridge;

summing means for receiving and adding the outputs of the electrical bridges.

12. A conveyor weighbridge comprising an idler unit for supporting a portion of the belt in a conveyor frame, the unit comprising dead roller means for contacting the underside of the conveyor belt, a frame supporting the roller means and including a transverse support, and laterally spaced flanges for securing the unit in a conveyor frame, wherein the flanges are connected by a transverse frame member extending beneath and parallel to the support, and transversely spaced cantilever strain gauge bridge units between the frame member and the support means, said units being responsive to vertical components of forces applied thereto by the support means, said units providing the sole support for said support means on said frame member, the support means being supported by the units vertically above the frame member, and each of said strain gauge bridge units having a support pillar for a cantilever arm extending vertically from the frame, the cantilever arm comprising a carrier pillar for the load to be measured extending vertically from the support means, the carrier pillar being horizontally displaced from the support pillar, and two vertically spaced cantilever beams connecting the carrier pillar to the support pillar, each having two horizontally spaced strain gauge elements bonded to surfaces of the beams extending in a horizontal plane, the strain gauge elements being connected into an electrical bridge such that their outputs responsive to vertical force components applied to the carrier pillar are additive, and the connections between the support pillar and the frame and between the carrier pillar and the support means being located so that the cantilever beams are cantilevered respectively above the frame and beneath the support means.

* * * * *